Dec. 14, 1926.
S. W. C. FITTS
1,610,504
FLYWHEEL STRUCTURE
Filed Jan. 5, 1926
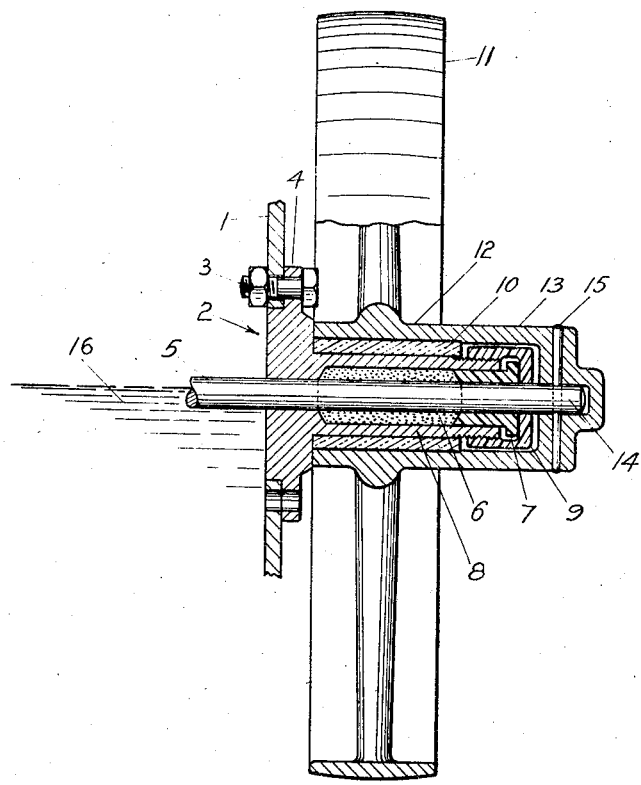
INVENTOR
Silas W. C. Fitts
BY M. C. Frank
ATTORNEY Patented Dec. 14, 1926.

1,610,504

UNITED STATES PATENT OFFICE.

SILAS W. C. FITTS, OF ALAMEDA, CALIFORNIA, ASSIGNOR, BY MESNE ASSIGNMENTS, TO STANDARD HEATING & REFRIGERATING COMPANY OF CALIFORNIA, OF SAN FRANCISCO, CALIFORNIA, A CORPORATION OF CALIFORNIA.

FLYWHEEL STRUCTURE.

Application filed January 5, 1926. Serial No. 79,304.

My invention relates broadly to flywheel structures, but more particularly to a flywheel and bearing therefor for use in connection with high-speed gas compressors.

Gas compressors for refrigerating units that are now commonly installed in homes are subject to a great deal of service attention, so much so that the selling price of such units is of necessity very high, due to the anticipated future service calls after installation and the renewal of certain parts that eventually cause trouble with attendant loss of efficiency in the refrigerating system.

The prime object of my present invention is to remedy this serious situation, and thereby reduce the selling price to a figure that is as attractive comparatively as that of the many other mechanical labor-saving devices on the market for permanent accessories to the home, apartment house and the like, and, at the same time produce a refrigerating unit that requires no more service attention than the average vacuum cleaner or washing machine.

The above referred to and heretofore serious defects have been at the flywheel of the belt-driven gas compressor, and at the bearing therefor and the stuffing box of the shaft adjacent the bearing. The overhung rapidly revolving flywheel, due to its mass and momentum, in due time causes its bearing and stuffing box to wear elliptical in shape, which results in detrimental vibration of the compressor and leakage of oil that lowers the efficiency of this unit in the refrigerating system to such an extent that service from the dealer or factory becomes absolutely imperative.

The objects of my invention include a stuffing box extending from the frame of the compressor, the transference of the remotely overhung flywheel to within very close proximity of the compressor frame, the enlargement of the flywheel bearing and its bearing surface, the provision of an oilless bearing bushing, the transference of the flywheel and its inherent weight from the revolving shaft of the compressor to the stationary stuffing box, novel means on the flywheel for connecting the same to the shaft and which means present smooth unobstructed surfaces that will not catch the clothing of an operator, and a housing embodying the said connecting means and also housing adjusting means for the packing of the stuffing box, the whole structure being virtually proof against leakage of oil at the shaft and the flywheel bearing.

The invention possesses other advantageous features, some of which, with the foregoing, will be set forth at length in the following description where I shall outline in full that form of the invention which I have selected for illustration in the drawing accompanying and forming part of the present specification. In said drawing I have shown one form of my invention, but it is to be understood that I do not limit myself to such form, since the invention, as expressed in the claims, may be embodied in a plurality of forms.

Referring to said drawing:

The figure shows my invention per se in central cross-section and attached to the frame of a machine.

The numeral 1 indicates a portion of the sidewall of the frame of any machine that can employ my invention to advantage, such as a gas compressor. The stuffing box 2 may be cast to the said sidewall or connected thereto as shown by bolts 3 through the flange 4. The box extends outwardly from the frame, and at its center is a bore to fittingly receive the shaft 5 of the machine. Concentric with the bore is the usual rebore for any approved packing 6. In and at the end of the rebore is a snug fitting gland 7 for retaining the packing in the box.

The concentric wall of the box is indicated at 8 and the outer end thereof is threaded to adjustably receive the nut 9 for forcing the gland 7 on the packing to compress the same about the shaft 5. The nut may have a knurled outside surface.

A snug fitting bushing 10 of oil-soaked wood or other suitable self-lubricating material may surmount the stuffing box wall 8, between the nut 9 and the flange 4 and may have a diameter greater than that of the nut.

Over the bushing is snugly received a flywheel 11 having a hub 12 which has a socket extension 13 of a bore and depth to house the gland and nut with suitable longitudinal adjusting space for the latter two elements. The end of the socket hub may be closed as shown, and the said end is concentrically bored to firmly receive the end 14 of the shaft 5. The flywheel is coupled, in this instance, to the shaft by means of a pin 15 which may be tapered by preference and driven through corresponding holes formed in the shaft and hub extension. The pin ends are preferably made flush with the surface of the hub so as to be continuous with the smooth surfaces of the hub to avoid all projections and thereby eliminate the possible catching of clothing thereon. The pin may be backed out at will when occasions arise to adjust the packing.

In operation the bearing for the flywheel will at times be the outside cylindrical surface of the stuffing box which has substantially a length equal to the face of the belt-driven flywheel 11, and should the box become heated and expand, the bushing 10 may then bind or freeze onto the box, and the flywheel will at such times bear and turn on the bushing, which may be considered as a floating one and will follow the course of least resistance. For all practical purposes I find that the oil 16 in the machine sufficiently lubricates and cools the shaft 5, and that my flywheel structure is proof against oil leakage from the interior to the exterior, and thus I conserve all the oil which heretofore leakage thereof has been a constant source of annoyance and trouble of a serious nature.

What I claim as new and desire patent protection thereon of the United States is the following:

1. A flywheel structure for a gas compressor comprising a stuffing box extending outwardly from the compressor, a flywheel having a closed-ended hub journaled on and encasing said box, and oil-tight coupling means carried by the flywheel and adapted to engage the shaft of the compressor.

2. A flywheel structure for a gas compressor, comprising a stuffing box extending outwardly from the compressor, an oil-absorbing bushing sleeved on said box, a flywheel having an oiltight closed-ended hub journaled on said bushing, and means for coupling the flywheel to the shaft of the compressor; said hub and bushing being formed with broad bearing areas whereby to absorb traces of oil leaking past the stuffing box.

3. A flywheel structure comprising a stuffing box, a self-lubricating bushing, journaled on said stuffing box, and a flywheel; the stuffing box having a length greater than the face of the flywheel journaled on said bushing, the bushing being of a length substantially that of the face of the flywheel and adapted to surmount the stuffing box, a compression gland for the interior of the stuffing box and a compression nut for the exterior of the gland and the stuffing box; and the flywheel having a hub and extension thereon, the hub adapted to surmount the bushing and the extension the compression nut.

4. A flywheel structure comprising a stuffing box, a self-lubricating bushing journaled on said stuffing box, and a flywheel; the stuffing box having a length greater than the face of the flywheel journaled on said bushing, the bushing being of a length substantially that of the face of the flywheel and adapted to surmount the stuffing box, a compression gland for the interior of the stuffing box and a compression nut for the exterior of the gland and the stuffing box; and the flywheel having a hub and extension thereon, the hub adapted to surmount the bushing and the extension the compression nut; and the said extension having a closed end and carrying fitted removable means for coupling the flywheel to a shaft, the said end being a seal against oil leakage.

5. A flywheel structure comprising a stuffing box, a self-lubricating bushing journaled on said stuffing box, and a flywheel, the stuffing box having a length greater than the face of the flywheel journaled on said bushing, the bushing being of a length substantially that of the face of the flywheel and adapted to surmount the stuffing box, a compression gland for the interior of the stuffing box and a compression nut for the exterior of the gland and the stuffing box; and the flywheel having a hub and extension thereon, the hub adapted to surmount the bushing and the extension the compression nut; and the said extension having a closed end and carrying fitted removable means for coupling the flywheel to a shaft, the said end being a seal against oil leakage; the said compression gland and nut being adjustable and housed within the said extension.

In testimony whereof, I affix my signature.

SILAS W. C. FITTS.